(12) United States Patent
Chiaverini et al.

(10) Patent No.: US 9,602,995 B2
(45) Date of Patent: Mar. 21, 2017

(54) SYNCHRONIZING ONLINE AND OFFLINE CHARGING DATA

(71) Applicant: Verizon Patent and Licensing Inc., Arlington, VA (US)

(72) Inventors: Marc Chiaverini, Randolph, NJ (US); Javier A. Ferro, Somerset, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

(21) Appl. No.: 14/712,115

(22) Filed: May 14, 2015

(65) Prior Publication Data

US 2016/0337832 A1 Nov. 17, 2016

(51) Int. Cl.
*H04M 11/00* (2006.01)
*H04W 4/24* (2009.01)
*H04M 15/00* (2006.01)

(52) U.S. Cl.
CPC .............. *H04W 4/24* (2013.01); *H04M 15/64* (2013.01); *H04M 15/65* (2013.01)

(58) Field of Classification Search
CPC ........ H04W 4/24; H04W 12/06; H04L 12/14; H04L 65/1016; H04L 12/1403; H04L 12/1425; H04L 12/1407; H04L 12/1485; H04L 12/1471; H04L 12/1467; H04L 12/1457; H04L 12/1482; H04L 67/141; H04M 15/41
USPC ......................................................... 455/406
See application file for complete search history.

(56) References Cited

U.S. PATENT DOCUMENTS

2015/0133080 A1* 5/2015 Sharma ............. H04M 15/8228
455/406
2016/0127565 A1* 5/2016 Sharma ................. H04M 15/67
455/406

* cited by examiner

*Primary Examiner* — Kwasi Karikari

(57) ABSTRACT

Systems and methods for synchronizing online and offline charging data are disclosed. In some implementations, a charging trigger machine (CTM) determines that charging data for a mobile user account at an online charging system (OCS) and charging data for the mobile user account at an offline charging system (OFCS) are to be synchronized. The CTM sends a credit control request (CCR) to the OCS. The CTM sends an account charging request (ACR) to the OFCS simultaneously with sending the CCR to the OCS and in response to determining that the charging data at the OCS and the charging data at the OFCS are to be synchronized. The ACR includes an instruction for a service data container (SDC) level trigger to be added to an output charging data record (CDR) created at the OFCS and associated with the mobile user account.

20 Claims, 5 Drawing Sheets

SYNCHRONIZING ONLINE AND OFFLINE CHARGING DATA

BACKGROUND

A mobile network operator may allow users of mobile devices to access voice and data services using the mobile devices. A user of a mobile device may sign up for a data plan that limits the user to a certain data limit (e.g., 5 GB per month) and charges the user an overage fee (e.g., $0.01 per MB over the 5 GB limit) for data used in excess of the data limit. To allow the user to avoid the overage fee or to encourage the user to switch to a more expensive data plan with a larger data limit, the mobile network operator may provide the user with alerts when the user has consumed a certain percentage (e.g., 50%, 90%, 95%, etc.) of his/her data limit.

The alerts may be provided by an online charging system (OCS) that is updated frequently. A different offline charging system (OFCS), which is updated less frequently, may be used to generate the user's mobile network bills. This scheme may lead to inconsistencies between the alerting system at the OCS and the billing system at the OFCS, resulting in user dissatisfaction, for example, if a user is billed for an overage (using data stored at the OFCS) but not notified (using data stored at the OCS) that he/she is near his/her data limit. As the foregoing illustrates, a new approach for maintaining mobile network data use records may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
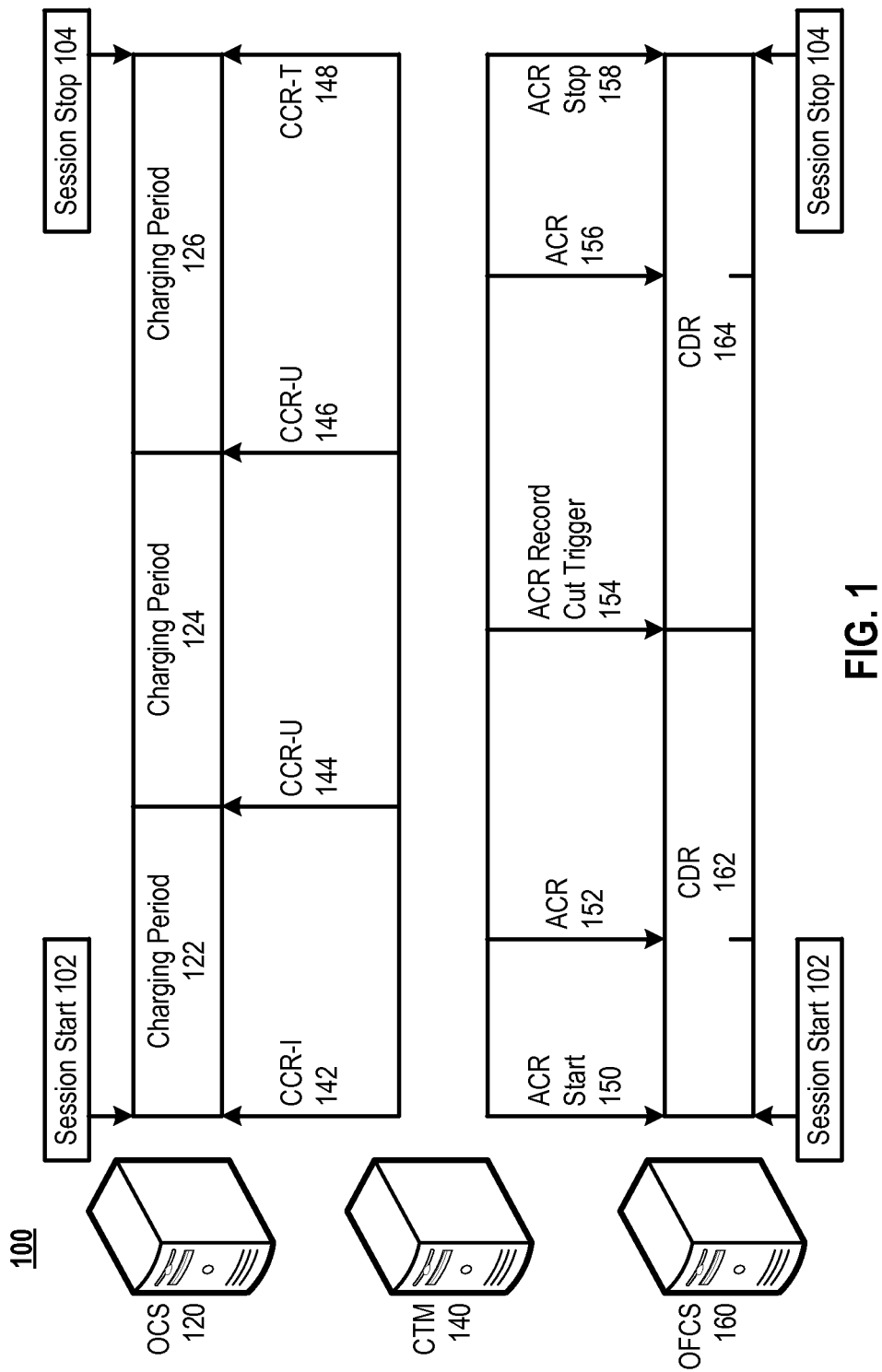
FIG. 1 illustrates a first exemplary data flow of a mobile network operator charging system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, a mobile network operator may allow users of mobile devices to access voice and data services using the mobile devices. A user of a mobile device may sign up for a data plan that limits the user to a certain data limit and charges the user an overage fee for data used in excess of the data limit. The mobile network operator may provide the user with alerts when the user has consumed a certain percentage of his/her data limit.

The alerts may be provided by an online charging system (OCS) that is updated frequently. A different offline charging system (OFCS), which is updated less frequently, may be used to generate the user's mobile network bills. As a result of the different updating frequencies, there may be inconsistencies between the alerting system at the OCS and the billing system at the OFCS. This may result in user dissatisfaction, for example, if a user is billed for an overage during a billing cycle, where the user had not been notified that he/she was near his/her data limit at the end of the billing cycle. As the foregoing illustrates, a new approach for maintaining mobile network data usage records may be desirable.

The Gy interface may be used to transfer online charging information from a charging trigger machine (CTM) to the OCS. To inform the OCS of an event relevant to charging the user's account (e.g., use of the mobile network, change of rate plan, etc.), a credit control request (CCR) may be sent from the CTM to the OCS. The OCS may respond and confirm receipt of the CCR by sending a credit control answer (CCA) to the CTM. The CCR and CCA formats may be defined by the Third Generation Partnership Project (3GPP) standards organization. The information contained in the CCR may be used for online charging and alerting users of mobile devices regarding their data usage. The CTM may correspond to a charging trigger function (CTF). While the CTM is described herein as a machine, the CTM may be implemented only in software (e.g., as a virtual machine or a program stored in memory), only in hardware, or in a combination of software and hardware.

The Rf interface may be used to transfer offline charging information from the CTM to the OFCS. An account charging request (ACR) may be sent from the CTM to the OFCS, and the OFCS may respond by sending an account charging answer (ACA) back to the CTM. The ACR and ACA formats may be defined by the 3GPP standards organization. The ACR may include information about data usage at the mobile device (e.g., the mobile device downloaded a 50 kb file through the mobile network), and the ACA may include a confirmation that the ACR was received at the OFCS. The information contained in the ACR may be used for offline charging and generating bills for users of mobile devices based on their usage of the mobile network.

ACRs are formatted to include high level subscriber information, and may include a packet switched (PS) information level and one or multiple service data containers (SDCs) which carry charging information (e.g., number of kilobytes used). As set forth in the 3GPP standard, ACRs are aggregated at the OFCS to make one or more charging data records (CDRs). Boundaries between the CDRs may be set forth in the PS information level.

One difficulty with the scheme described above is that there is no synchronization of records between the OCS and OFCS after the records are initially generated. The subject technology, among other things, provides for synchronization of OCS and OFCS records by having a CTM send an ACRs to the OFCS simultaneously with sending a CCR to the OCS. When the charging record is created using the data of the OFCS, the CDRs from the OFCS may be split into multiple parts based on a charge condition contained in a SDC provided to the OFCS in an ACR. The subject technology, among other things, allows the billing system, which receives records from both the OCS and OFCS, to align the records and to verify that there are no inaccuracies between the records.

The subject technology provides techniques for synchronizing data usage records between the OCS and OFCS. A CTM determines that charging data for a mobile user account at an OCS and charging data for the mobile user account at an OFCS are to be synchronized. In response to determining that charging data at the OCS and charging data at the OFCS are to be synchronized, the CTM sends an ACR to the OFCS simultaneously with sending the CCR to the OCS. The ACR includes instructions for a SDC level trigger to be added to an output CDR created at the OFCS and associated with the mobile user account.

While the subject technology is described herein in conjunction with a single user account, the CTM, OCS, and OFCS may store charging and billing information for multiple different user accounts of a mobile service provider. The subject technology is described herein in conjunction with some events taking place "simultaneously." As used herein, the term "simultaneously" may refer to events taking place without any intentional delay or with minimal intentional delay (e.g., if parallel processing is impossible or impractical). However, delay may still occur, for example, due to network delay, processing delay, or errors/bugs in hardware or software. The delay may be 0.1 seconds, 1 second, 10 seconds, 1 minute, 1 hour, etc., depending on, among other things, processing and network speed. In addition, the term "simultaneously" encompasses its plain and ordinary meaning.

FIG. 1 illustrates a first exemplary data flow 100 of a mobile network operator charging system, which includes an OCS 120, a CTM 140, and an OFCS 160. The data flow 100 is for generating and storing information regarding mobile data usage of a mobile network user account. The data is generated and stored for the purposes of billing a customer associated with the mobile network user account and for providing the customer with notifications related to his/her data usage, for example, so that the customer is not surprised when he/she receives a bill with data overage charges.

As shown in the data flow 100, at the session start 102, the CTM 140 sends a CCR initialize (CCR-I) message 142 to the OCS 120. In response, the OCS opens charging period 122, in which a certain set of charging rules (e.g., rate plan, billing period, etc.) are applied. Later, the CTM 140 sends a CCR update (CCR-U) message 144 to the OCS 120, causing the OCS 120 to open charging period 124, which may have a different set of charging rules. For example, charging period 122 may correspond to a mobile network bill for the month of January 2015, and charging period 124 may correspond to a mobile network bill for the month of February 2015. Alternatively, charging period 124 may correspond to a promotional period (e.g., 15% discount on data overages, 1 GB of free data, etc.) or to a new rate plan (e.g., 10 GB per month rather than 5 GB per month) selected by the user when the CCR-U 144 was sent. Later, another CCR-U 146 is sent from the CTM 140 to the OCS 120, triggering a new charging period 126 to start at the OCS 120. The charging period 126 ends at session stop 104, when the CTM 140 send a CCR terminate (CCR-T) message 148 to the OCS 120. The OCS 120 may respond to each of the CCRs 142, 144, 146, and 148 by sending a CCA back to the CTM 140, and the CCF 140 may receive the CCA. The CCA may include an acknowledgement that the corresponding CCR 142, 144, 146 or 148 was received at the OCS 120.

As also shown in the data flow 100, the CTM 140 sends an ACR start message 150 to the OFCS 160 at session start 102. In response, the OFCS 160 initializes the CDR 162. Later, the CTM 140 sends another ACR 152 to the OFCS 160, which causes information to be added to the CDR 162. For example, the information may include an indication that the user accessed additional data. Later, the CTM 140 sends an ACR 154 with a record cut trigger to the OFCS 160. The record cut trigger causes the CDR 162 to be closed and a new CDR 164 to be opened. As shown, the timing of the ACR 154 with the record cut trigger may be different from the timings of the CCR-Us 144 and 146. For example, the timing of the ACR 154 with the record cut trigger may correspond to a time when a bill is generated for the mobile network user account. Thus, the records at the OFCS 160 may not reflect the latest accounting and billing changes made to the account, as recorded at the OCS 120.

Later, the CTM 140 sends another ACR 156 to the OFCS 160, which causes information to be added to the CDR 164. At session stop 104, the CTM 140 sends an ACR stop message 158 to the OFCS 160, which causes the OFCS 160 to close CDR 164. As set forth in FIG. 1, the timings of the CCR-I 142 and the ACR start 150 are synchronized, and the timings of the CCR-T and the ACR stop 158 are synchronized. However, no message corresponding to CCR-U 144 or CCR-U 146 is sent to the OFCS 160.

Figure 2:
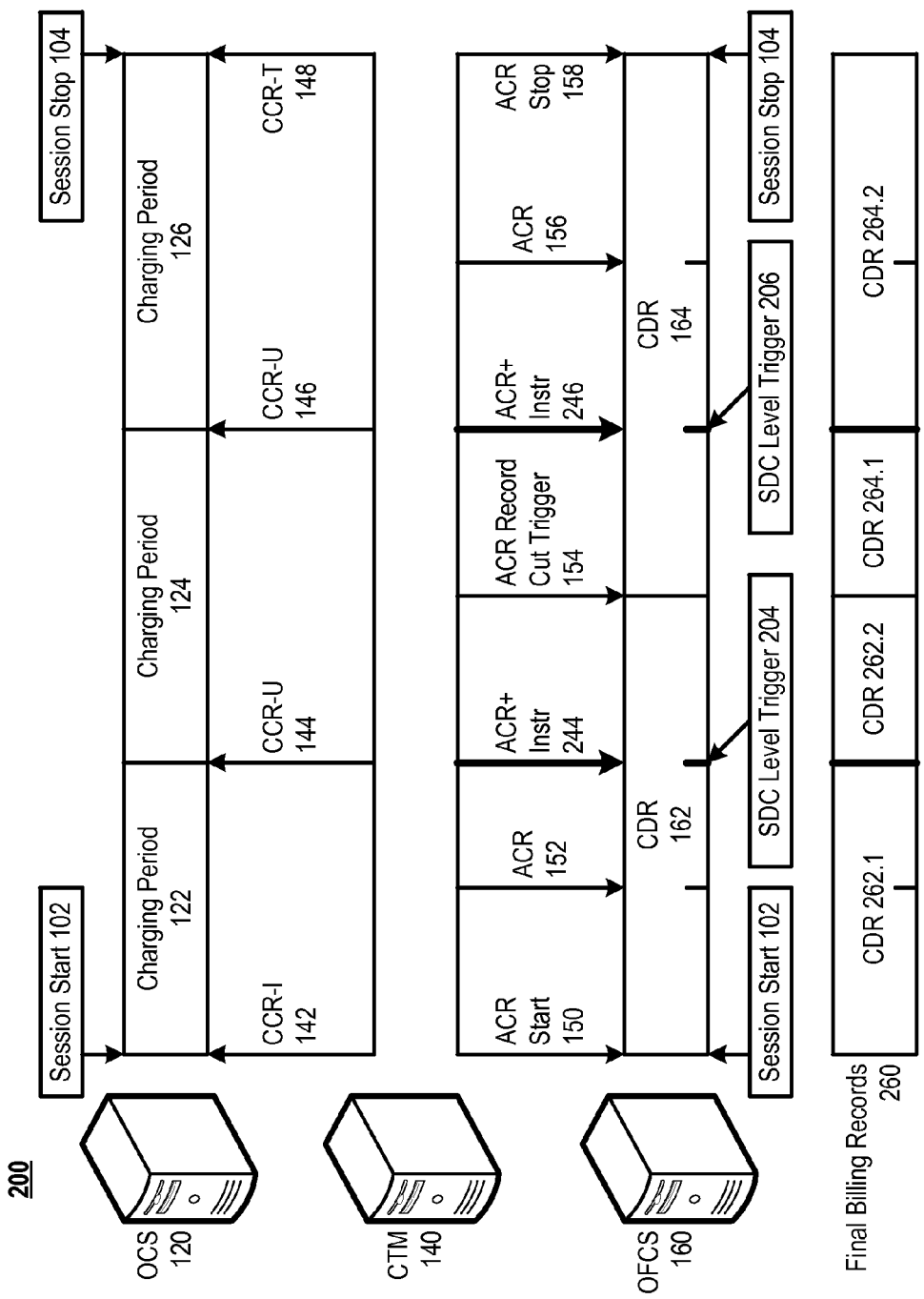
FIG. 2 illustrates a second exemplary data flow of a mobile network operator charging system.

To summarize, FIG. 1 illustrates CCRs 142, 144, 146, and 148 being sent from the CTM 140 to the OCS 120, and ACRs 150, 152, 154, 156, and 158 being sent from the CTM 140 to the OFCS 160. With the exception of the session start 102 and the session stop 104 times, the CCRs 144 and 146, and the ACRs 152, 154, and 156 are not synchronized and, thus, OCS 120 and OFCS 160 records are not aligned. Thus, the CDRs 162 and 164, which are generated by the OFCS 160 and are used for preparing account bills and charges, may not contain the latest account change information stored at the OCS 120. FIG. 2, described below, illustrates a technique for synchronizing the information stored at the OFCS 162 with the latest account change information stored at the OCS 120.

FIG. 2 illustrates a second exemplary data flow 200 of a mobile network operator charging system. As shown, the data flow 200 is similar to the data flow 100 and includes CCRs 142, 144, 146, and 148, and ACRs 150, 152, 154, 156, and 158, similar to those in the data flow 100. In addition, as shown in FIG. 2, an ACR 244 is sent from the CTM 140 to the OFCS 160 simultaneously with the CCR-U 144. The ACR 244 includes an instruction for a SCD level trigger 204 to be added to the CDR 162 created at the OFCS 160. Similarly, an ACR 246 is sent from the CTM 140 to the OFCS 160 simultaneously with the CCR-U 146. The ACR 246 includes an instruction for a SCD level trigger 206 to be added to the CDR 164 created at the OFCS 160. When the final billing records 260 are created using the data stored at the OFCS 160, including the CDRs 162 and 164, the SDC level triggers 204 and 206 cause their corresponding CDRs 162 and 164, respectively, to be split into two parts. As shown, the CDR 162 is split into two CDRs 262.1 and 262.2, with the border between CRD 262.1 and CDR 262.2 set forth by the SDC level trigger 204. Similarly, the CDR 164 is split into two CDRs 264.1 and 264.2, with the border between CDR 264.1 and CDR 264.2 set forth by the SDC level trigger 206.

As can be noted from FIG. 2, charging period 122 in the OCS 120 corresponds to CDR 262.1 in the final billing records 260. Charging period 124 in the OCS 120 corresponds to CDRs 262.2 and 264.1 in the final billing records 260. Charging period 126 in the OCS 120 corresponds to CDR 264.2 in the final billing records 260. Thus, each charging period 122, 124, and 126 of the OCS 120 may be processed differently when the final billing records 260 are used to generate bill(s) for the customer. For example, if a promotion (e.g., 50% discount on overage charges) was applied to the customer's account during charging period 124, when generating the final bill, that promotion may be applied to CDRs 262.2 and 264.1, but not to CDRs 262.1 and 264.2.

As shown in FIG. 2, when the ACRs 244 and 246 are received at the OFCS 160, there is no record cut at the OFCS 160 as the ACRs 244 and 246 lack a PS level record cut trigger (which may be included in the ACR 154). One reason for this lack of record cut trigger is that charging periods tend to terminate at the same time (e.g., billing periods may end at midnight, local time, on a certain day of the month). Having many record cut triggers sent to the OFCS 160 simultaneously may overload the OFCS 160, possibly causing it to crash or require expensive repairs and debugging.

Figure 3:
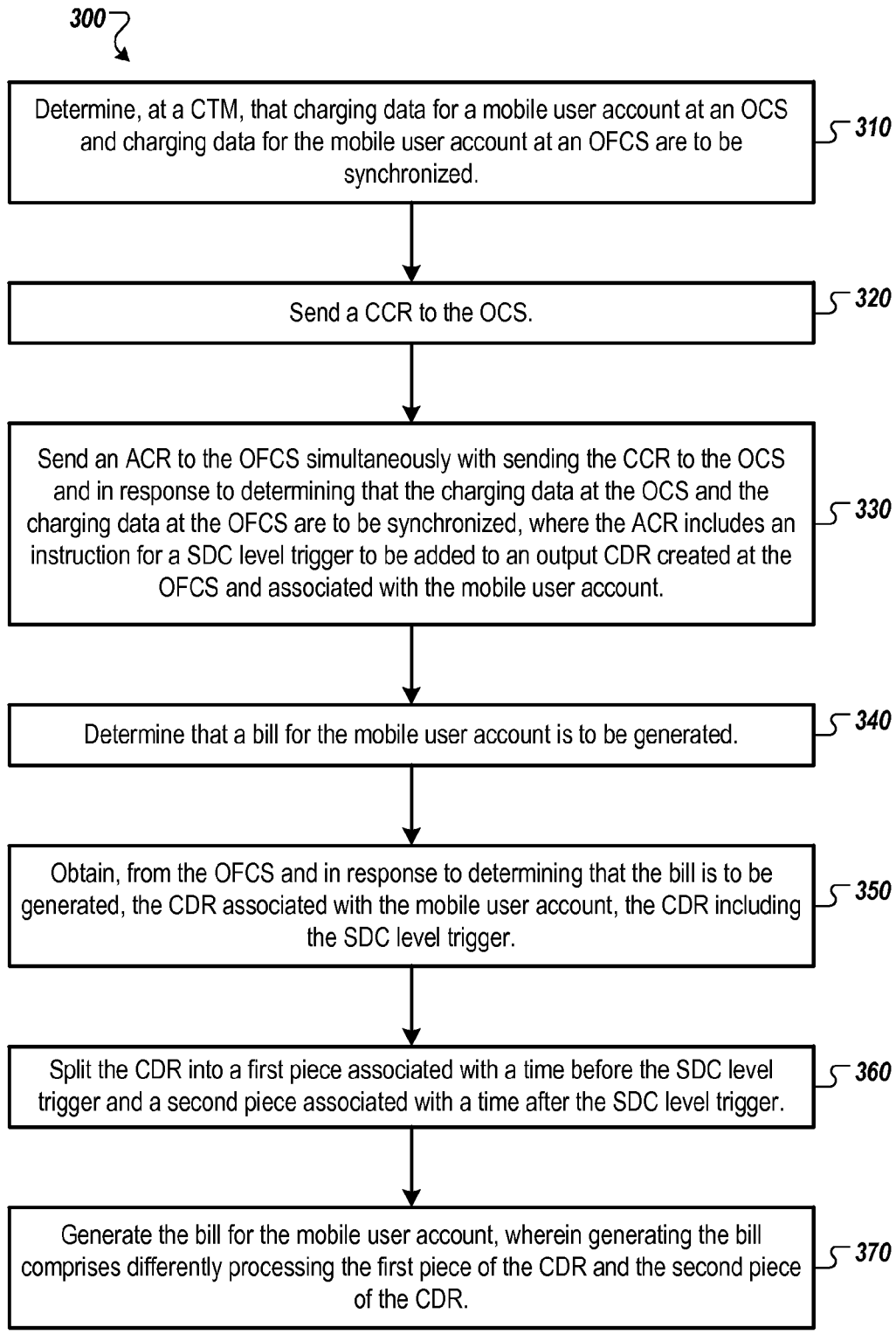
FIG. 3 illustrates an exemplary process for synchronizing online and offline charging data.

FIG. 3 illustrates an exemplary process 300 for synchronizing online and offline charging data. The process 300 begins at step 310, where a CTM (e.g., CTM 140) determines that charging data for a mobile user account at an OCS (e.g., OCS 120) and charging data for the mobile user account at an OFCS (e.g., OFCS 160) are to be synchronized. The determination that the charging data are to be synchronized may be based on, for example, determining that an end of a billing cycle for the mobile user account has been reached, determining that a promotion has been applied (or has stopped being applied) to the mobile user account or determining that a rate plan for the mobile user account has changed. The CTM may communicate with the OCS using a Gy interface, and with the OFCS using an Rf interface.

In step 320, the CTM sends a CCR (e.g., CCR 144) to the OCS. For example, the CCR may indicate that a billing cycle has ended, that a rate plan has been changed or that a promotion is being applied (or ceasing to be applied). The CCR may cause records at the OCS to be updated. The OCS may respond to the CCR by sending, to the OCS, a CCA confirming that the CCR was received at the OCS. The CTM may receive the CCA.

In step 330, the CTM sends an ACR (e.g., ACR 244) to the OFCS simultaneously with sending the CCR to the OCS. The ACR is sent in response to determining that the charging data at the OCS and the charging data at the OFCS are to be synchronized. The ACR includes an instruction for a SDC level trigger (e.g., SDC level trigger 204) to be added to an output CDR (e.g., CDR 162) created at the OFCS and associated with the mobile user account. The OFCS may respond to the ACR by sending an ACA to the CTM confirming that the ACR was received at the OFCS. The CTM may receive the ACA from the OFCS. The ACR and the SDC level trigger may not include a record cut trigger and, thus, may not cause a record cut at the OFCS at the time the ACR is received. Instead, record cut triggers may be provided to the OFCS from the CTM in the PS level.

In step 340, the CTM determines that a bill for the mobile user account is to be generated. For example, the CTM may determine that the bill is to be generated in response to the billing cycle ending. Alternatively, another trigger for determining that the bill is to be generated, such as the customer requesting to close the account, may be used. In another example, the CTM does not determine that a bill for the mobile user account is to be generated. Instead, the CTM uses the CCR reporting-reason or close-cause to aid OFCS and OCS in marking usage records that may eventually be used for billing.

In step 350, the CTM obtains, from the OFCS and in response to determining that the bill is to be generated, the CDR (e.g., CDR 162) associated with the mobile user account. The CDR includes the SDC level trigger (e.g., SDC level trigger 204) generated above. The CTM may obtain the CDR by requesting the CDR from the OFCS.

In step 360, the CTM splits the CDR (e.g., CDR 162) into a first piece (e.g., CDR 262.1) associated with a time before the SDC level trigger and a second piece (e.g., CDR 262.2) associated with a time after the SDC level trigger. The separation may be done based on the SDC level trigger or using the SDC level trigger. These two pieces now correspond to separate CDRs that may be processed differently when generating the bill for the customer. Alternatively, the OFCS may split the CDR and the CTM may provide appropriate records markings for the splitting of the CDR.

In step 370, the CTM generates the bill for the mobile user account. Alternatively, a billing system, different from the CTM, may use records from the OFCS to generate a bill for the customer. Generating the bill includes differently processing the first piece of the CDR and the second piece of the CDR. For example, if a promotional rate was applied in the second piece and not in the first piece, the data usage in the second piece, but not in the first piece, may be billed at the promotional rate. If the first piece is associated with a January 2015 billing cycle, and the second piece is associated with a February 2015 billing cycle, the first piece may be billed in January 2015, and the second piece may be billed in February 2015. After step 370, the process 300 ends.

FIG. 3 describes the steps 310-370 of the process 300 being implemented according to a certain order. However, the steps may be implemented in any order. In some cases, some of the steps 310-370 may be skipped. For example, if a bill does not need to be generated, the steps 310-330 may be implemented without implementing the steps 340-370.

Figure 4:
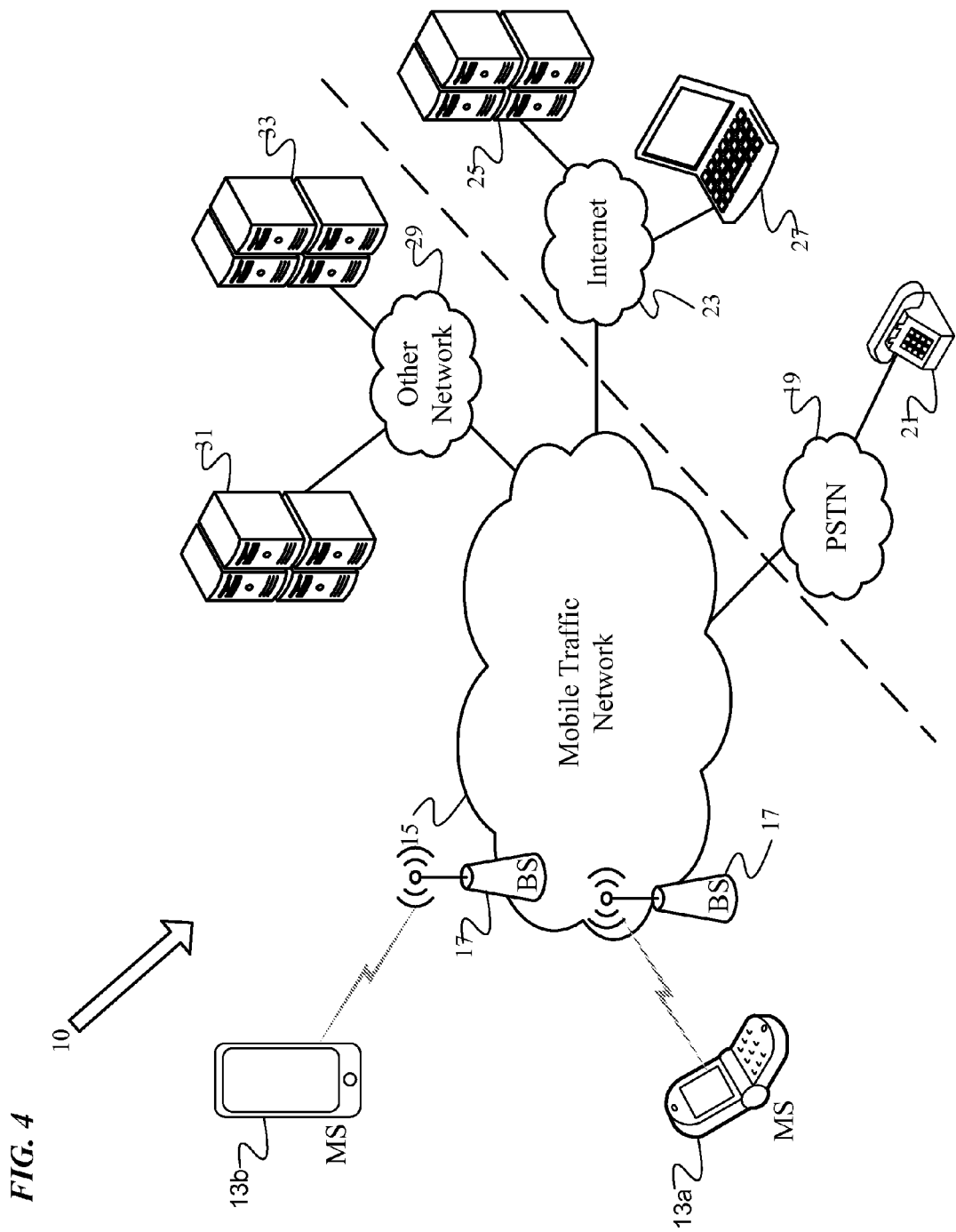
FIG. 4 is a high-level functional block diagram of an exemplary system of networks/devices that provide various communications for mobile stations.

FIG. 4 illustrates an exemplary system 10 offering a variety of mobile communication services in a mobile network where online and offline charging data may be synchronized. The servers illustrated in FIG. 4 may correspond to the OCS 120, the CTM 140 or the OFCS 160 of FIGS. 1 and 2. The example of FIG. 4 shows two mobile stations (MSs) 13a and 13b as well as a mobile communication network 15. The network 15 provides mobile wireless communications services to those stations as well as to other mobile stations (not shown), for example, via a number of base stations (BSs) 17. The present techniques may be implemented in or used in any of a variety of available mobile networks 15, and the drawing shows only a very simplified example of a few relevant elements of the network 15 for purposes of discussion here.

The wireless mobile communication network 15 might be implemented as a network conforming to the long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. As illustrated in FIG. 4, the servers 25 and 31 may communicate with one another over one or more networks. The application servers 31 may correspond to the OCS 120, the CTM 140 or the OFCS 160 of FIGS. 1 and 2. The application servers 31 may implement one or more of the steps 310-370 of the process 300 described in conjunction with FIG. 3. For example, the application server 31 may be used to collect online and offline billing data for a user account, to synchronize the collected online and offline billing data, and to generate billing statements to be provided to the user account.

A mobile station 13 communicates over the air with a base station 17. The mobile station 13 communicates through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application 31 provides appropriate information to the authentication server 33 to allow authentication server 33 to authenticate the mobile station 13 as outlined herein. Upon successful authentication, the authentication server 33 informs the server application 31, which in turn provides access to the service via data communication through the various communication elements (e.g. 29, 15 and 17) of the network 10.

As shown by the above discussion, functions relating to voice and data communication may be implemented on computers connected for data communication via the components of a packet data network, as shown in FIG. 4. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 6:
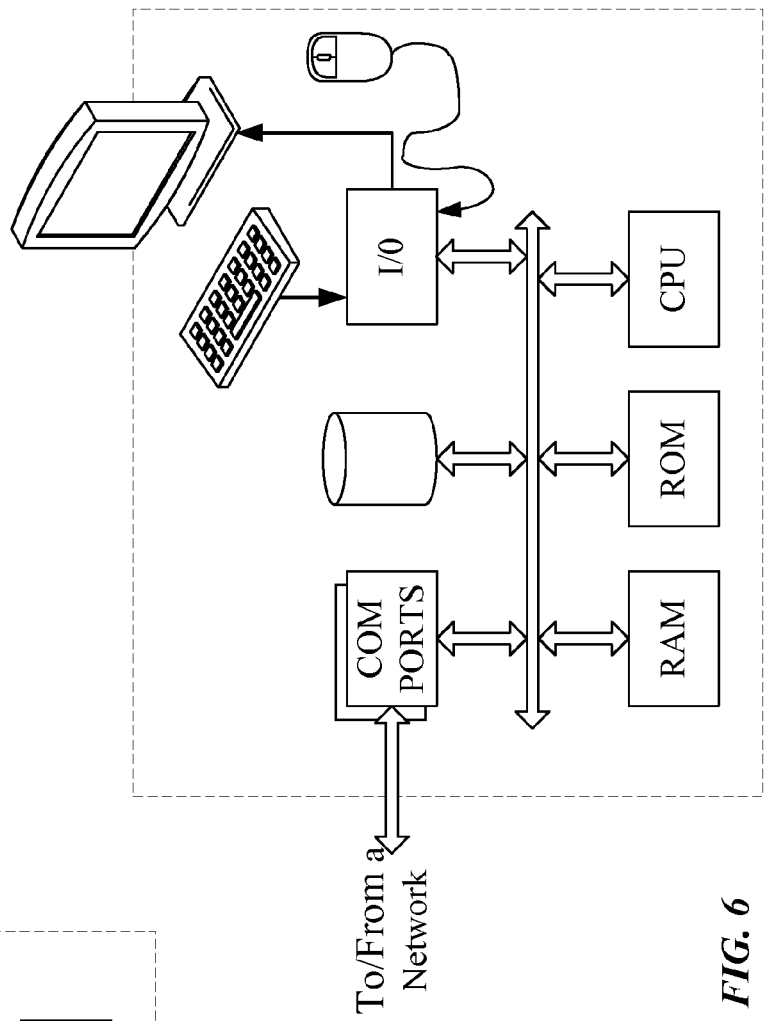
FIG. 6 is a simplified functional block diagram of a personal computer or other work station or terminal device, which may be configured to serve as an online charging system, an offline charging system or a charging trigger machine.
Figure 5:
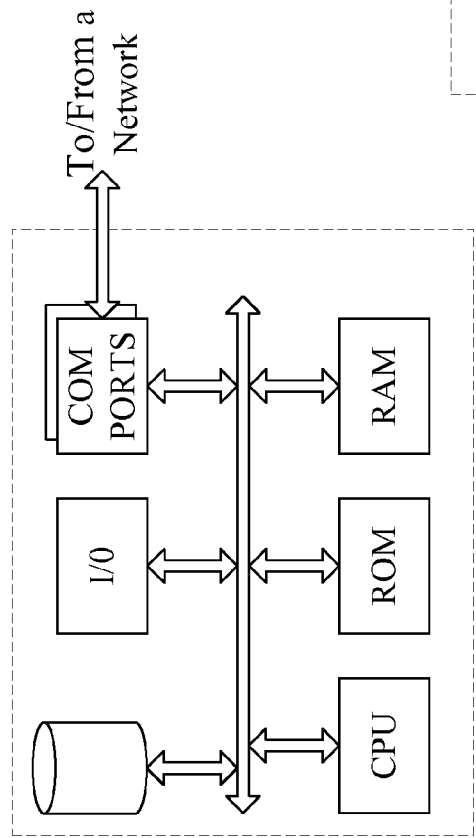
FIG. 5 is a simplified functional block diagram of a computer that may be configured to serve as an online charging system, an offline charging system or a charging trigger machine.

FIGS. 5 and 6 provide functional block diagram illustrations of general purpose computer hardware platforms. The computers illustrated in FIGS. 5 and 6 may correspond to the OCS 120, the CTM 140 of the OFCS 160 of FIGS. 1 and 2. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 5 and 6). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for synchronizing online and offline charging data outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement instructions storing code corresponding to the steps 310-370 of the process 300 of FIG. 3. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, at a charging trigger machine (CTM), that charging data for a mobile user account at an online charging system (OCS) and charging data for the mobile user account at an offline charging system (OFCS) are to be synchronized;
   sending a credit control request (CCR) to the OCS; and
   in response to determining that the charging data at the OCS and the charging data at the OFCS are to be synchronized, sending an account charging request (ACR) to the OFCS simultaneously with sending the CCR to the OCS, wherein the ACR includes an instruction for a service data container (SDC) level trigger to be added to an output charging data record (CDR) created at the OFCS and associated with the mobile user account.

2. The method of claim 1, wherein the ACR and the SDC level trigger do not include a record cut trigger and do not cause a record cut at the OFCS.

3. The method of claim 1, further comprising:
   determining that a bill for the mobile user account is to be generated;
   in response to determining that the bill is to be generated, obtaining from the OFCS the CDR associated with the mobile user account, the CDR including the SDC level trigger;
   splitting the CDR into a first piece associated with a time before the SDC level trigger and a second piece associated with a time after the SDC level trigger; and
   generating the bill for the mobile user account, wherein generating the bill comprises differently processing the first piece of the CDR and the second piece of the CDR.

4. The method of claim 1, wherein determining that the charging data at the OCS and the charging data at the OFCS are to be synchronized comprises:
   determining that an end of a billing cycle for the mobile user account has been reached.

5. The method of claim 1, wherein determining that the charging data at the OCS and the charging data at the OFCS are to be synchronized comprises:
   determining that a promotion has been applied to the mobile user account.

6. The method of claim 1, wherein determining that the charging data at the OCS and the charging data at the OFCS are to be synchronized comprises:
   determining that a data plan for the mobile user account has been changed.

7. The method of claim 1, wherein the CTM communicates with the OCS using a Gy interface, and wherein the CTM communicates with the OFCS using a Rf interface.

8. The method of claim 1, further comprising:
   receiving, in response to the CCR, a credit control answer (CCA) from the OCS, confirming that the CCR was received at the OCS; and
   receiving, in response to the ACR, an account charging answer (ACA) from the OFCS, confirming that the ACR was received at the OFCS.

9. A non-transitory computer-readable medium comprising instructions which, when executed by one or more computers, cause the one or more computers to:
   determine, at a charging trigger machine (CTM), that charging data for a mobile user account at an online charging system (OCS) and charging data for the mobile user account at an offline charging system (OFCS) are to be synchronized;
   send a credit control request (CCR) to the OCS; and
   in response to determining that the charging data at the OCS and the charging data at the OFCS are to be synchronized, send an account charging request (ACR) to the OFCS instantaneously with sending the CCR to the OCS, wherein the ACR includes an instruction for a service data container (SDC) level trigger to be added to an output charging data record (CDR) created at the OFCS and associated with the mobile user account.

10. The non-transitory computer-readable medium of claim 9, wherein the ACR and the SDC level trigger do not include a record cut trigger and do not cause a record cut at the OFCS.

11. The non-transitory computer-readable medium of claim 9, further comprising instructions which, when executed by the one or more computers, cause the one or more computers to:
- determine that a bill for the mobile user account is to be generated;
- in response to determining that the bill is to be generated, obtain from the OFCS the CDR associated with the mobile user account, the CDR including the SDC level trigger;
- split the CDR into a first piece associated with a time before the SDC level trigger and a second piece associated with a time after the SDC level trigger; and
- generate the bill for the mobile user account, wherein generating the bill comprises differently processing the first piece of the CDR and the second piece of the CDR.

12. The non-transitory computer-readable medium of claim 9, wherein the instructions which, when executed by the one or more computers, cause the one or more computers to determine that the charging data at the OCS and the charging data at the OFCS are to be synchronized comprise instructions which, when executed by the one or more computers, cause the one or more computers to:
- determine that an end of a billing cycle for the mobile user account has been reached.

13. The non-transitory computer-readable medium of claim 9, wherein the instructions which, when executed by the one or more computers, cause the one or more computers to determine that the charging data at the OCS and the charging data at the OFCS are to be synchronized comprise instructions which, when executed by the one or more computers, cause the one or more computers to:
- determine that a promotion has been applied to the mobile user account.

14. The non-transitory computer-readable medium of claim 9, wherein the instructions which, when executed by the one or more computers, cause the one or more computers to determine that the charging data at the OCS and the charging data at the OFCS are to be synchronized comprise instructions which, when executed by the one or more computers, cause the one or more computers to:
- determine that a data plan for the mobile user account has been changed.

15. The non-transitory computer-readable medium of claim 9, wherein the CTM communicates with the OCS using a Gy interface, and wherein the CTM communicates with the OFCS using a Rf interface.

16. The non-transitory computer-readable medium of claim 9, further comprising instructions which, when executed by the one or more computers, cause the one or more computers to:
- receive, in response to the CCR, a credit control answer (CCA) from the OCS, confirming that the CCR was received at the OCS; and
- receive, in response to the ACR, an account charging answer (ACA) from the OFCS, confirming that the ACR was received at the OFCS.

17. A charging trigger machine (CTM) comprising:
- a processor; and
- a memory comprising instructions which, when executed by the processor, cause the processor to:
  - determine that charging data for a mobile user account at an online charging system (OCS) and charging data for the mobile user account at an offline charging system (OFCS) are to be synchronized;
  - send a credit control request (CCR) to the OCS; and
  - in response to determining that the charging data at the OCS and the charging data at the OFCS are to be synchronized, send an account charging request (ACR) to the OFCS simultaneously with sending the CCR to the OCS, wherein the ACR includes an instruction for a service data container (SDC) level trigger to be added to an output charging data record (CDR) created at the OFCS and associated with the mobile user account.

18. The CTM of claim 17, wherein the ACR and the SDC level trigger do not include a record cut trigger and do not cause a record cut at the OFCS.

19. The CTM of claim 17, the memory further comprising instructions which, when executed by the processor, cause the processor to:
- determine that a bill for the mobile user account is to be generated;
- in response to determining that the bill is to be generated, obtain from the OFCS the CDR associated with the mobile user account, the CDR including the SDC level trigger;
- split the CDR into a first piece associated with a time before the SDC level trigger and a second piece associated with a time after the SDC level trigger; and
- generate the bill for the mobile user account, wherein generating the bill comprises differently processing the first piece of the CDR and the second piece of the CDR.

20. The CTM of claim 17, wherein the instructions which, when executed by the processor, cause the processor to determine that the charging data at the OCS and the charging data at the OFCS are to be synchronized comprise instructions which, when executed by the processor, cause the processor to:
- determine that an end of a billing cycle for the mobile user account has been reached.

* * * * *